(12) United States Patent
Rubinson

(10) Patent No.: US 6,361,578 B1
(45) Date of Patent: Mar. 26, 2002

(54) EASY-ATTACH AIR-DUCT FILTER FRAME

(75) Inventor: Rhonda Rubinson, 400 W. 119th St. #11L, New York, NY (US) 10027

(73) Assignee: Rhonda Rubinson, New York, NY (US)

( * ) Notice: Subject to any disclaimer, the term of this patent is extended or adjusted under 35 U.S.C. 154(b) by 1 day.

(21) Appl. No.: 09/620,388

(22) Filed: Jul. 20, 2000

(51) Int. Cl.$^7$ .......................... B01D 29/56; B01D 39/10

(52) U.S. Cl. ............... 55/487; 55/511; 55/501; 55/DIG. 31; 55/DIG. 35; 55/495

(58) Field of Search .................. 55/490, 495, 501, 55/511, DIG. 31, DIG. 35, 486, 487

(56) References Cited

U.S. PATENT DOCUMENTS

| | | | |
|---|---|---|---|
| 3,912,473 A | * 10/1975 | Wilkins | ........... 55/501 |
| 4,334,899 A | 6/1982 | McConnell | |
| 4,961,849 A | 10/1990 | Hull et al. | |
| 4,976,753 A | * 12/1990 | Huang | ........... 55/501 |
| 5,525,145 A | * 6/1996 | Hodge | ........... 55/495 |
| 5,863,310 A | 1/1999 | Brown et al. | |

FOREIGN PATENT DOCUMENTS

WO      WO9930087      6/1999

OTHER PUBLICATIONS

Jefferson Kole, "Magnetic Storm Windows" in *Fine Homebuilding*, Annual Issue on Houses, Spring 1995 No. 94, p. 106. Bimonthly periodical published by The Taunton Press, Newton, CT 06470–5506.

* cited by examiner

Primary Examiner—Robert A. Hopkins

(57) ABSTRACT

The Easy-Attach Air-Duct Filter Frame is a simple device that permits ordinary consumer to filter the air issuing from interior air ducts in buildings either with or without forced air circulation systems. The Frame, which consists of four frame sides (1) manufactured to create a channel opening into which a filter or filters may be inserted, is easily installed on the surface of an existing grille by magnetic backing (4a) either by adhering directly on to front surface of the register grille, or by a attaching a thin steel frame (4b) to the surface of the grille before attaching the Frame. Access to the filters for installation, removal, and cleaning is provided by a removable pullout front-grate (3), which secures the filters in the unit when it is in place. A mesh screen (2) at the back of the frame sides (1) helps restrict the passage of dirt and vermin into the Frame unit. The device and its method of installation effectively redirect air flow from the duct through the Frame unit. When used in conjunction with the desired filters, the Easy-Attach Air-Duct Filter Frame may help reduce health risks posed by airborne particulate matter and vermin, which could promote disease, and may also improve the environmental quality of the inhabitable space into which the duct opens by reducing dirt odors, and noise present in and carried by certain interior air ducts.

15 Claims, 3 Drawing Sheets

3

3

...

EASY-ATTACH AIR-DUCT FILTER FRAME

CROSS REFERENCE TO RELATED APPLICATIONS

Not applicable.

STATEMENT OF FEDERALLY SPONSORED RESEARCH OR DEVELOPMENT

Not applicable.

REFERENCE TO A MICROFICHE APPENDIX

Not applicable.

BACKGROUND OF THE INVENTION

As an apartment building dweller in the heart of an urban area (New York City), it has come to my attention that there is no device available to the general consumer that enables the control of air quality issuing from indoor air ducts which commonly terminate at register grilles opening directly into inhabited space. When I refer to "air ducts" I am referring to both ducting for forced air circulation systems, and the interior ducts present in buildings without forced air circulation systems.

This lack of quality control of air issuing from interior ducts creates a range of environmental issues. They may be summarized as follows:

i. Health risks. Inanimate particulate matter, as well as myriad allergens, fungus, and bacteria can collect and grow within ducting, which may then be expelled into the inhabited space causing a health risk to those who aspirate them. Vermin may also live within ducts and enter inhabited spaces through the vent openings. Both of these risks increase in buildings where the ducts are not regularly serviced (vacuumed and disinfected) and in older buildings. Health consequences may include increased incidence of asthma (increasingly common in urban areas) and other allergic conditions, as well as occurrences of disease caused by certain airborne pathogens and/or vermin.

ii. Quality of life issues. These are consequences that, while possibly not dangerous, affect the quality of the environment in the inhabited space into which air vents open. Daily expulsion of significant amounts of particulate matter at vent openings require frequent, sometimes daily, cleaning, and may create situations where walls need to be repainted more frequently than normal. Other quality life of issues include odor control (since air ducts may carry odors from one space into another) and noise control (since air ducts may carry and amplify sound from one space into another).

These health risks and quality of life complaints may be minimized by the installation of an appropriate filter (or multiple filters) at duct termination points, without significantly compromising the air circulation of the building. In order for these advantages to be easily available to the consumer, the filter(s) are inserted into a frame that may be quickly be attached to the outside of the existing vent opening (register grille) by means of magnetic backing. Access to the filter(s) for replacement or cleaning purposes is accomplished by means of a pull-out front grate which snaps into place behind the front edge of the filter frame.

It is likely that this invention falls under Classification ID 052 (Static Structures—Buildings), possibly in Subclass 218 ("structures . . . having means of directing a gaseous fluid (air or other gas) therein to or there from" rooms in buildings), and Subclass 49 (Movable or Removable Closures). DIG. 4 is also pertinent as it addresses "magnetic means for building components."

I am unaware of any invention that marries magnetic means to air duct filters or frame housings. I am aware of the availability of magnetically installed storm windows (available in kit form see the periodical "Fine Homebuilding," #94). There is also a U.S. Patent (U.S. Pat. No. 5,863,310) for a grill/filter mounting assembly designed to replace a register grille specifically for forced air duct termination points, with the possible inclusion of a filter and a possible scent dispenser. I am also aware of a WIPO patent (WO9930087) for a vent filter screen treated with various oils to filter and medicate the air issuing from the vent. Neither of these patents employs either magnetic means of installation or the filter housing assembly described below.

BRIEF SUMMARY OF THE INVENTION

The Easy-Attach Air-Duct Filter Frame is a filter housing designed to fit over existing register grilles at the termination points of air ducts into interior inhabitable spaces without significantly impeding the air circulation in the ducts. The device is designed for use in buildings either with or without forced air circulation systems.

The device is easily installed by the consumer by means of magnetic backing. It is easily maintained by means of quick access to filters for cleaning and replacement through a simple pull-out front grate. Both installation and maintenance can be performed by most ordinary consumers, without the necessity of retaining a contractor for those purposes.

When one or more filters are inserted into the device, it improves the quality of air entering the inhabitable space from the air duct. When used in conjunction with the appropriate filters, the device therefore contributes to the reduction of health risks by reducing the presence of airborne matter that may promote disease and by reducing the ability of vermin to enter the inhabited space at the duct termination point; the device also may improve environmental quality by reducing odors, noise, and airborne dirt.

BRIEF DESCRIPTION OF THE SEVERAL VIEWS OF THE DRAWING

All part names and numbers are those referred to in "Detailed Description of the Drawings" below.

DETAILED DESCRIPTION OF THE INVENTION

Figure 1:
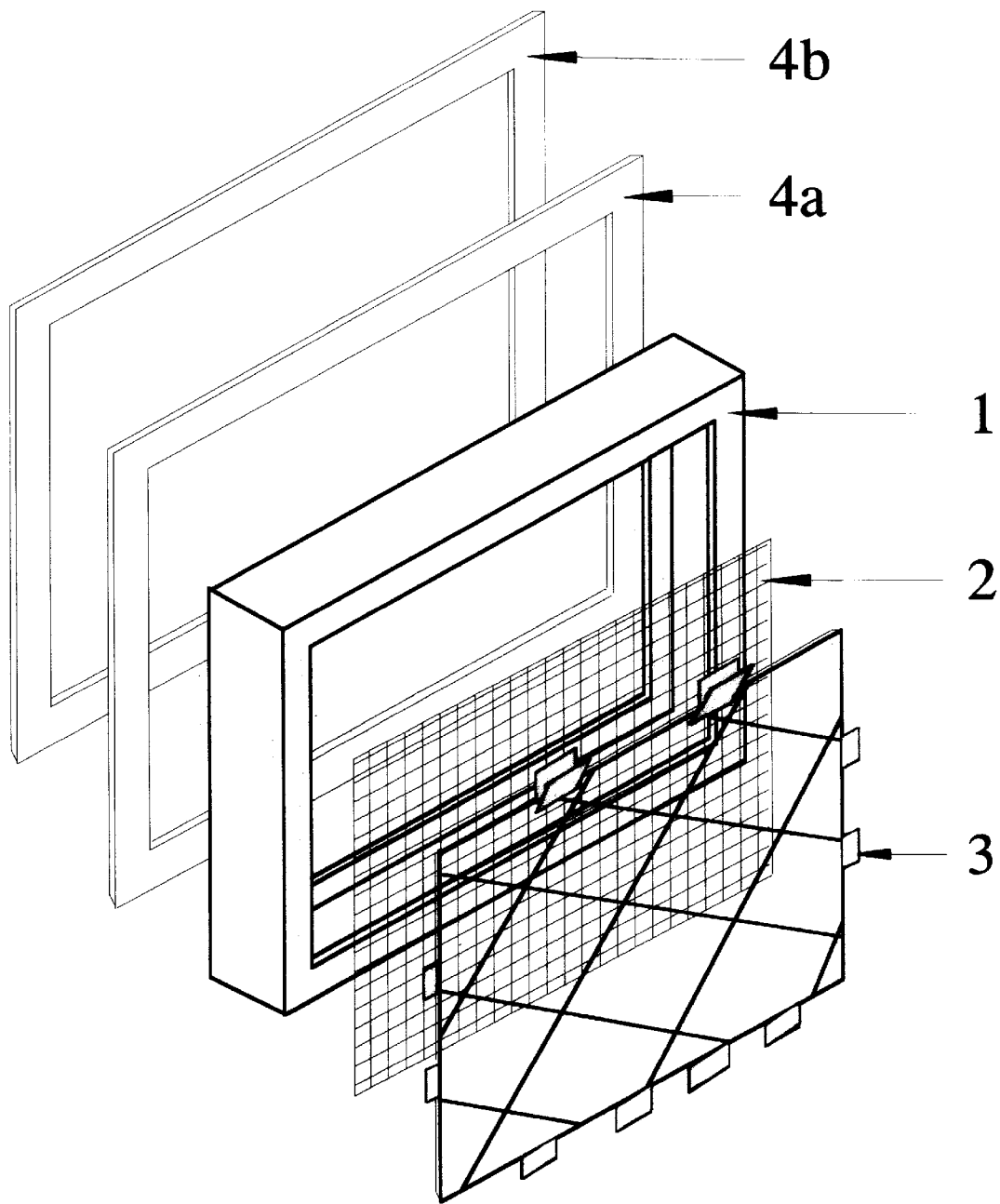
FIG. 1 is an exploded isometric right view, showing the frame sides (1), the screen (2), the pull-out front grate (3), the magnetic backing (4*a*), and the optional light steel frame (4*b*).
Figure 2:
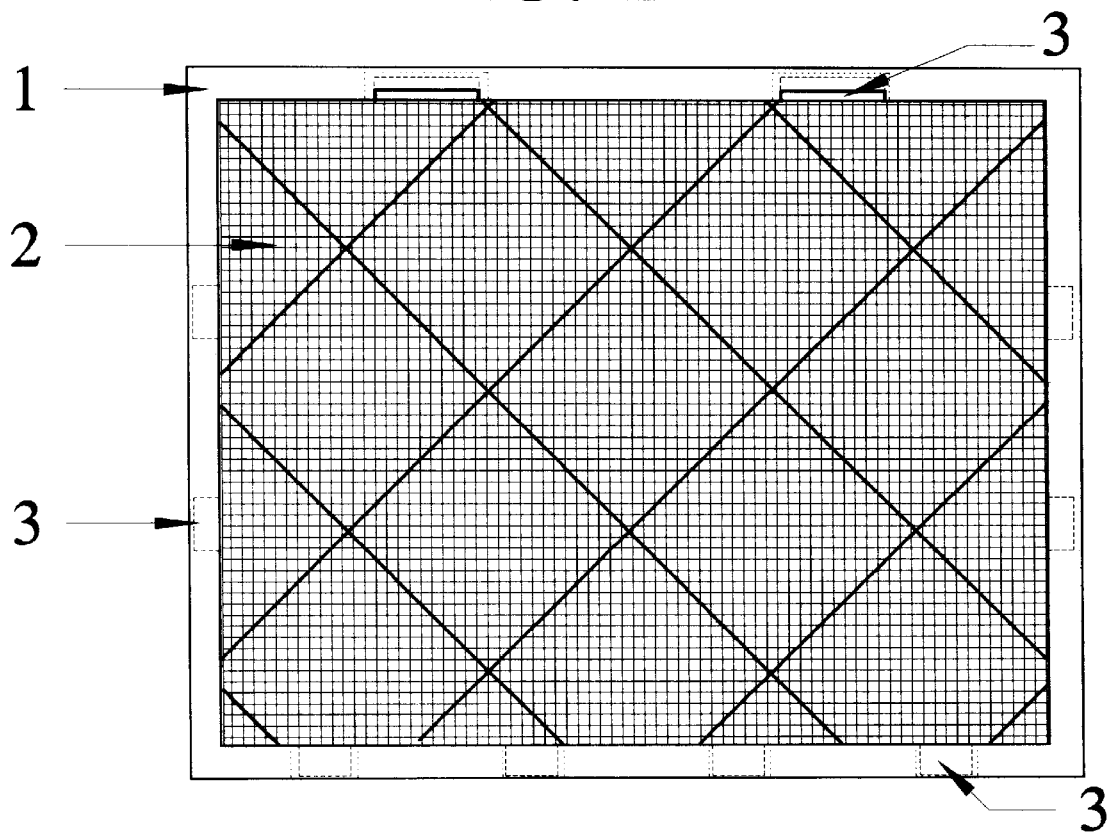
FIG. 2 is a front elevation, showing the frame sides (1), the screen (2), and the pull-out front grate (3).
Figure 3:
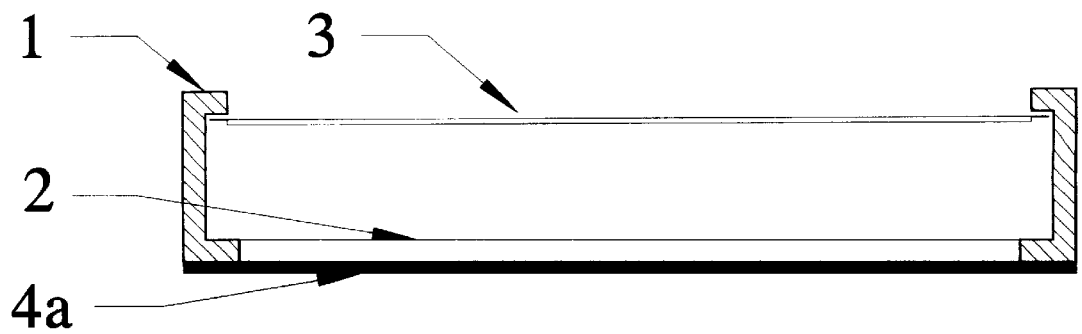
FIG. 3 is a center transverse section, showing the frame sides (1), the screen (2), the pull-out front grate (3) and the magnetic backing (4*a*).
Figure 4:
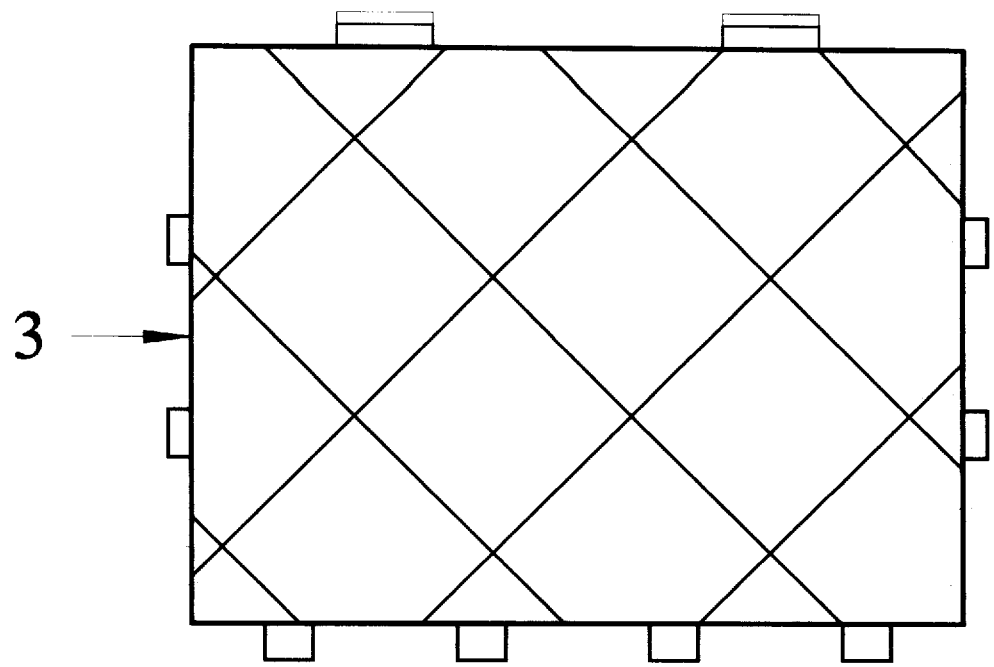
FIG. 4 is a front elevation, showing the pull-out front grate (3).
Figure 5:
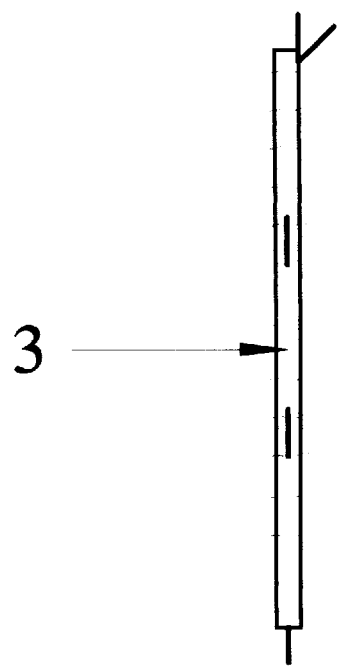
FIG. 5 is a side elevation, showing the pull-out front grate (3).

Reference list of parts in drawings, as listed in "Brief Description of the Several Views of the Drawing" above:

The Easy-Attach Air-Duct Filter Frame consists of four parts:

1. The four frame sides, in either rectangular or square configuration;
2. Screening fully covering in the inside area of the frame at the back inside chanell of the frame sides (1),
3. A pull-out front grate assembly permitting access to the interior of the frame,
4. Method of installation of the device, by means of
   a. magnetic backing on the rear of the four frame sides, and
   b. a thin steel frame to be attached, if necessary, to the existing register grille, possibly means of adhesive backing.

DETAILED DESCRIPTION OF THE PREFERRED EMBODIMENTS

1. FRAME SIDES. The four sides of the filter frame housing (1) are the main structure of the device, to which parts 2, 3 and 4 are attached, and within which various filters (not included in the device) may be inserted. The size and configuration of the frame sides (1) is determined by the dimensions of existing register grilles. The material of the frame sides (1) should be lightweight, and capable of meeting all building code requirements for interior ductwork. Some obvious choices include polyvinyl chloride or aluminum.

The frame sides (1) are manufactured in either a channel or "j" bar configuration, to permit the insertion of filters into the channel created by joining the 4 sides into a single unit. The width of both the sides and channel opening is determined by the material used to manufacture the sides, and the number and thickness of the filters to be inserted therein.

2. SCREENING. A screening (2) is permanently installed into the back interior channel of the frame sides (1), with an adhesive or some other method intended to be permanent. The openings in the screen (2) should be large enough to permit reasonably free air passage, while limiting amounts of vermin and airborne dirt that can pass through the device.

In conjunction with the frame sides, the screen or mesh (2) should be capable of being cleaned in easily by the consumer, and should be made of material that is lightweight and meets all building code criteria for interior ductwork.

3. PULL-OUT FRONT GRATE. The front grate (3) is designed to securely hold filters within the device when in place, and to be easily and completely removed when access to the interior of the device is desired. It consists of a single-piece unit, with flexible hinges on the top and tabs at the bottom end designed to fit into matching slots on the top and bottom side only of the interior of the frame sides (1). The remaining two sides of the grate (3) have small flexible tabs designed to snap under the top channel of the frame sides (1), thereby serving to hold the filter(s) in place when installed. Removal is accomplished by pressing the flexible hinges downward and pulling forward, thereby freeing the grate (3) from the frame sides (1).

The pull-out front grate (3) is produced from material that is lightweight and moderately flexible. Since the grate's function is to hold filters securely in the unit, it is not necessary nor desirable for the grate to be of size and material that will significantly hinder air flow and/or add unnecessary weight to the device. Therefore the fewest and thinnest lattices possible (given the manufacturing material) should be used. The number and spacing of the lattices is determined by the dimensions of the frame sides.

4. METHOD OF INSTALLATION. It is crucial that the method of installation effectively seal off the grille opening, directing air flow through the device. This is accomplished through the use of:

a. Magnetic backing. The device should be produced with magnetic stripping (4a) in uniform thickness and strength around the full back frame (1) of the device, and attached to the device by means of permanent adhesive. For most register grilles manufactured of metal, where excess build-up of paint or the surface of the grille is not dented or otherwise marred at the surface, magnetic stripping alone will securely attach the device to the face of the existing register grille.

b. Steel frame. In cases where the grille is not metal or its surface is not capable of adhesion by magnetic stripping alone, a thin steel frame (4b), possibly attached by means of permanent adhesive is included for attachment to the surface of the register grille. The frame sides (1) backed by magnetic stripping (4a) is then attached to the steel frame.

Variations of material, size, and to a certain extent, method, may occur in parts 1, 2, 3, 4a and 4b without departing from the objectives and scope of the invention presented herein.

I claim:

1. In conjunction with a non-forced air interior air duct, for an inhabited space, which interior air duct terminates at an extant register grille, a filter frame to be mounted on said register grille by magnetic means, which filter frame comprises:

four frame sides, screening, said screening installed into a back interior channel of the frame sides a pull-out front grate, situated behind a front channel formed by the frame sides;

magnetic backing, on the back of the frame sides; and an optional steel frame, on the back of the frame sides.

2. The filter frame according to claim 1 wherein the frame sides comprise one or more channels in cross-section, permitting the insertion of one or more filters in between the screening and the pull-out front grate.

3. The filter frame according to claim 1, wherein the height of said channels in cross-section is sufficiently small to permit air issuing from the interior air-duct to enter the filter frame.

4. The filter frame according to claim 1 wherein the screening is permanently installed in the back interior channel of the frame sides.

5. The filter frame according to claim 4 wherein the size of the openings in the screening is large enough to permit reasonably free flow of air into the filter frame, but small enough to inhibit vermin and some airborne dirt from entering the filter frame.

6. The filter frame according to claim 2 in the pull-out front grate is manufactured with tabs to fit into interior slots located directly behind a forward inside channel opening of the frame sides and therefore in front of said one or more filters inserted within the frame sides.

7. The filter frame according to claim 6 wherein the pull-out front grate is manufactured with flexible hinges and frame sides to permit removal of said pull-out front grate when the hinges are pushed down and pulled forward.

8. The filter frame according to claim 6, wherein said pull-out front grate is strong enough to hold said one or more filters in the frame unit against air currents entering the unit from the air duct.

9. The filter frame according to claim 6, wherein said pull-out front grate has latticework with openings large enough to permit reasonably free flow of air from the air duct through the unit.

10. The filter frame according to claim 1, wherein said magnetic backing is the means for installation of the filter frame on to the faceplate of the extant register grille.

11. The filter frame according to claim 10, wherein said magnetic backing is permanently installed on the back of the frame sides.

12. The filter frame according to claim 1, which comprises said steel frame and is suitable for attachment to the extant register grille to permit magnetic installation of the filter frame in cases where the magnetic backing alone is not sufficient to accomplish installation of the filter frame.

13. The filter frame according to claim 12, wherein said steel frame is backed by adhesive to permit its installation to the extant register grille.

14. The filter frame according to claim 12, wherein said steel frame has area dimensions that match the magnetic backing.

15. The filter frame according to claim 2 which further comprises a plurality of filters inserted into said one or more channels.

* * * * *